Figure 1:
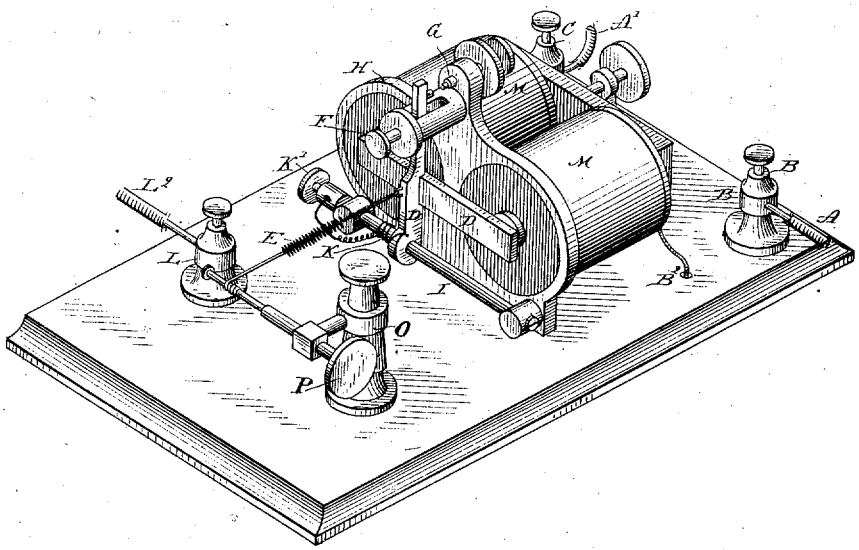

C. C. DRAKE.

Assignor to THE AMERICAN AUTOMATIC LIGHTNING ARRESTER COMPANY OF NEW YORK.

TELEPHONE AND TELEGRAPH PROTECTOR.

No. 10,663. Reissued Nov. 24, 1885.

Witnesses:
Ernest Abshagen
N. E. Sexton

Inventor:
Charles C. Drake,
By his Attorney:
Geo. H. Fenneman

UNITED STATES PATENT OFFICE.

CHARLES C. DRAKE, OF TRENTON, NEW JERSEY, ASSIGNOR TO THE AMERICAN AUTOMATIC LIGHTNING ARRESTER COMPANY OF NEW YORK.

TELEPHONE AND TELEGRAPH PROTECTOR.

SPECIFICATION forming part of Reissued Letters Patent No. 10,663, dated November 24, 1885.

Original No. 280,916, dated July 10, 1883. Application for reissue filed March 20, 1885. Serial No. 159,619.

*To all whom it may concern:*

Be it known that I, CHARLES C. DRAKE, a citizen of the United States, residing at Trenton, county of Mercer, State of New Jersey, have invented certain new and useful Improvements in Protectors for Telephonic and Telegraphic Instruments, of which the following is a specification.

My invention relates to a device adapted to be placed in circuit with telephonic, telegraphic, or other similar instruments, and by means of which they are protected from the injurious or destructive action of electric currents of greater potential or quantity than those with which they are designed to work, and which normally traverse the circuits in which such instruments are included. It is a matter of frequent occurrence in such locations where conductors convey currents of electricity having a considerable difference of potential or quantity, and where such conductors are arranged near to one another, that they may become, from various causes, entangled, or a conductor, by becoming detached from its support, may fall, and so "cross" the conductor or conductors of other circuits. Thus, for instance, conductors conveying heavy currents, such as are used for electric-lighting systems may in this manner be brought into contact with the conductors conveying the relatively weak and feeble currents employed with telegraphic or telephonic systems, and the latter become media for conveying currents of abnormal intensity or quantity. Static charges may also during atmospheric electrical disturbances accumulate on the conductors and be discharged with serious effect; hence it is desirable to arrive at a means for diverting such excessive or abnormal currents from that portion of the main circuit in which the instrument or instruments it is desired to protect are located. At the same time it is also desirable that the instrument or instruments should not be cut out of circuit, but should always be in a condition to perform its or their normal function irrespective of any excess of current above the normal amount circulating in the main line. To attain this object, I have devised the here-in-described instrument or protecting device, which consists, essentially, of an electro magnet or magnets having its or their coil or coils formed from a few turns of coarse wire, whose electrical resistance for a given length is equal to or less than that of a similar length of the main-line conductor, and provided with an armature arranged between an adjustable contact-point on the electro-magnet and an insulated adjustable back-stop, and adapted to be normally held away from its electro-magnet by means of its own weight or by a retractile spring, which can be so adjusted as to prevent the armature from responding to currents traversing the magnet or magnets not exceeding the ordinary working-current. As before stated, the coil on the electro-magnet is in the main-line circuit, and hence any current which circulates in the main line must necessarily pass through the coils on the magnet. After passing through the magnet the main-line conductor is divided into two parts or paths—one of high resistance, within which is included the telegraphic, telephonic, or other instruments to be protected, and the other of low resistance, normally open, but adapted to be closed when the current circulating in the main line imparts sufficient energy to the electro-magnet to enable it to attract its armature. It will be readily understood that the currents in the paths or branches will be in the inverse ratio of their resistance, and hence if the resistances be properly proportioned a current which will be sufficient to enable the telegraphic, telephonic, or signaling instruments to perform their normal functions, but not sufficient to injure them, will at all times be transmitted through the instruments, the strength or quantity of the current so transmitted varying with that of the main line, and all excess of current will be diverted through the path of low resistance around the protected instruments or back to the main-line conductor.

In the accompanying drawings, which illustrate my invention, similar letters of reference indicate like parts.

Figure 2:
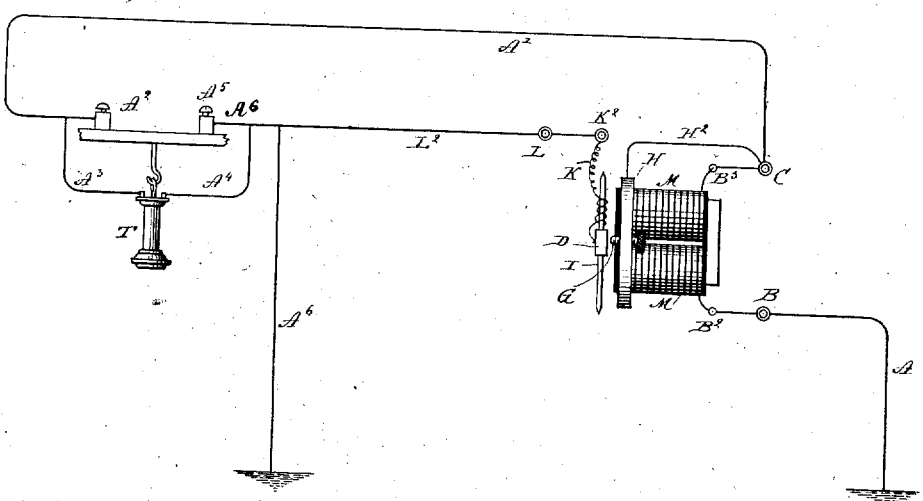

Figure 1 shows a view in perspective of the device according to my invention. Fig. 2 is a diagrammatic view illustrative of the different circuits.

In the drawings, A represents the main-line conductor connected to the binding-post B.

To the binding-post B, I attach one end of a coarse copper wire, which is carried through the opening $B^2$ in the base-plate, and is then wound upon the magnet or magnets M M to form its or their coil or coils, the other end of this wire being carried through the opening $B^3$ to the binding-post C on the opposite side of the instrument. I prefer to wind the magnet or magnets with but few convolutions of a coarse copper wire, whose electrical resistance for any given length shall be equal to or slightly greater than that of a similar length of the main-line conductor.

To the binding-post C, I attach one end of the copper wire $H^2$, which is also of low electrical resistance. The other end is connected to a screw, which passes through and makes contact with the brass plate H, which supports the electro-magnets M. Arranged in the upper part of this plate is the adjustable contact-screw G. Projecting from the face of the brass plate is a slotted tubular portion, N, in the end of which is arranged an adjustable screw, F. The projection N may be of metal or of insulating material, preferably of insulating material, and the screw F may be of metal with a point of non-conducting material, or it may be formed wholly of non-conducting material. Located in front of the magnet and supported upon a horizontal insulated axis is the armature D, the end of which projects through the slot in the tube N, and is provided on its end with a contact-point, which is opposite to the contact-point G on the top of the electro-magnet. The armature D is wholly of conducting material, and connected thereto at one end is the conductor K, of copper wire of small electrical resistance, the other end being attached to the binding-post K′ on the armature-axis, and thence connects through an opening, $K^2$, in the base-plate (shown in Fig. 2) with the binding-post L on the other end of the instrument.

Arranged opposite to the binding-post L is a suitable support, O, for the tension-screw P.

E is a tension-spring connected at one end to but insulated from the armature D, and attached at the other end to the tension-screw P.

Having thus described the invention so far as relates to its mechanical construction, I will now describe its connections and operation when included in the main-line circuit and in circuit with the telegraphic, telephonic, or other instruments which it is designed to protect. The main-line conductor A is connected to the binding-post B, and the current traversing such conductor is carried through the coils of the electro-magnet and out through the binding-post C, and thence by the conductor A′ to the binding-post $A^2$, by the telephone-cord $A^3$ to telephone T, by cord $A^4$ to binding-post $A^5$, to return main-line conductor $A^6$. It will be understood that the main-line conductor A′ $A^6$ can be a closed metallic circuit, or the ends of the conductors may be connected to ground. The path of the current as described is the path of the normal current, which is sufficient in amount to operate the instruments included in the circuit.

It is obvious that the conductors A′ and $A^6$ can be connected directly to the instrument or instruments to be protected without the intervention of any cord, such as those at $A^3$ and $A^4$.

A current of the amount described traversing the normal circuit and the coil of the electro magnet or magnets will impart sufficient energy to it or them to attract the armature, which is normally held away from the magnet by the tension of the spring E. The tension of this spring can be so adjusted as to exert more or less pull upon the armature, and thus provides a means of regulating the amount of current which can be transmitted through the normal circuit. Should any abnormal current be thrown upon the main line A, all of such current will pass through the magnet or magnets M M, instantly energizing them, so as to attract the armature D, and overcome the tension of the spring E, and bring the contact-point on the end of the armature in contact with the adjustable contact-point G over the magnets. By making such contact a path of low resistance—from binding-post C by conductor $H^2$ to brass plate H, to contact-point G, armature D, by wire K to binding-post K′, by wire to binding-post L, to conductor $L^2$, to return main conductor $A^6$, thence to main line or to ground—is provided, and the current will divide and circulate through the two paths, the amount of current transmitted through the separate paths being in the inverse ratio of their resistances.

I wish it understood that I do not limit myself to the particular mechanical construction of the device shown in the drawings and described in the specification, as it is obvious that many changes can be made therein without departing from the intent of my invention.

I am aware that various devices have heretofore been constructed for automatically breaking the circuit or for cutting the instruments to be protected out of the circuit; but so far as I am aware I am the first to construct a device which will automatically divert abnormal currents to earth without breaking or otherwise interfering with the circuit in which the instruments to be protected are located; or, in other words, a device located in the main circuit, and through which all the currents circulating on the main circuit passes, which is inactive and non-responsive to the normal current, but instantly responsive to an abnormal current, whereby the current is split up or divided into two parts and caused to travel two paths of unequal resistance.

I claim as my invention—

1. In an electro-magnetic device for the protection of electrical instruments from abnormal currents, the combination, with the electro-magnets M M, located in the main circuit, of the armature D, located in the shunt-circuit, and the interposed contacts and connections, whereby abnormal currents traversing the main line will energize the magnet, attract the armature, and divert through a shunt-circuit all excess of current above that normal to the main line, substantially as described.

2. In an electro-magnetic device for the protection of electrical instruments from abnormal currents, the combination of the magnets M M in the main circuit, the contact-point G, arranged over said magnets, and also connected to the main circuit, of the armature D, located in a shunt-circuit, and the circuit-connections, substantially as and for the purpose set forth.

3. In an electro-magnetic device for the protection of electrical instruments from abnormal currents, the combination, with the magnets M M, of band H, contact-point G, armature D, and interposed circuit-connections.

In testimony whereof I have hereunto subscribed my name this 6th day of March, A. D. 1885.

CHAS. C. DRAKE.

Witnesses:
GEO. H. BENJAMIN,
ALBERT J. BAYLESS.